US011865853B2

(12) United States Patent
Kurihara et al.

(10) Patent No.: US 11,865,853 B2
(45) Date of Patent: Jan. 9, 2024

(54) THERMOSENSITIVE RECORDING MEDIUM AND EXTERIOR MEMBER

(71) Applicant: Sony Corporation, Tokyo (JP)

(72) Inventors: Kenichi Kurihara, Kanagawa (JP); Nobukazu Hirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/759,947

(22) PCT Filed: Aug. 9, 2019

(86) PCT No.: PCT/JP2019/031609
§ 371 (c)(1),
(2) Date: Apr. 28, 2020

(87) PCT Pub. No.: WO2020/045054
PCT Pub. Date: Mar. 5, 2020

(65) Prior Publication Data

US 2021/0178796 A1 Jun. 17, 2021

(30) Foreign Application Priority Data

Aug. 31, 2018 (JP) ................................ 2018-163375

(51) Int. Cl.
*B41M 5/28* (2006.01)
*B41M 5/30* (2006.01)
(Continued)

(52) U.S. Cl.
CPC .............. *B41M 5/305* (2013.01); *B41J 2/442* (2013.01); *B41J 2/4753* (2013.01); *B41M 5/28* (2013.01);
(Continued)

(58) Field of Classification Search
CPC ........ B41M 5/28; B41M 5/305; B41M 5/323; B41M 5/337; B41M 5/465; B41J 2/442; B41J 2/4753; B41J 2002/4756
See application file for complete search history.

(56) References Cited

U.S. PATENT DOCUMENTS 5,279,912 A * 1/1994 Telfer ..................... G03B 35/24 430/293
5,625,524 A * 4/1997 Konagaya .............. G11B 5/633 365/120
(Continued)

FOREIGN PATENT DOCUMENTS

CN 101041308 A 9/2007
CN 102673212 A 9/2012
(Continued)

OTHER PUBLICATIONS

International Search Report issued in connection with PCT Application No. PCT/JP2019/031609, dated Nov. 5, 2019. (3 pages).

*Primary Examiner* — Justin Seo
*Assistant Examiner* — Kendrick X Liu
(74) *Attorney, Agent, or Firm* — K&L Gates LLP

(57) ABSTRACT

A thermosensitive recording medium according to an embodiment of the present disclosure includes: a recording layer that includes a coloring compound having electron-donating property, a developer having electron-accepting property, a photothermal conversion agent, and a polymer material; and a protective member that is stacked on the recording layer, and has a convexo-concave shape in a plane.

13 Claims, 8 Drawing Sheets

(51) Int. Cl.

| | |
|---|---|
| ***B41M 5/323*** | (2006.01) |
| ***B41M 5/337*** | (2006.01) |
| ***B41M 5/46*** | (2006.01) |
| ***B41J 2/44*** | (2006.01) |
| ***B41J 2/475*** | (2006.01) |

(52) U.S. Cl.

CPC ............ *B41M 5/323* (2013.01); *B41M 5/337* (2013.01); *B41M 5/46* (2013.01); *B41M 5/465* (2013.01)

(56) References Cited

U.S. PATENT DOCUMENTS

| | | | | |
|---|---|---|---|---|
| 2006/0276335 | A1* | 12/2006 | Tsuboi | B41M 5/34 427/127 |
| 2009/0315321 | A1* | 12/2009 | Michieli | B42D 25/324 283/111 |
| 2013/0157847 | A1* | 6/2013 | Tatewaki | B41M 5/42 503/226 |
| 2018/0335550 | A1* | 11/2018 | Makuta | B42D 25/342 |
| 2019/0389235 | A1* | 12/2019 | Kadokura | B41J 2/525 |

FOREIGN PATENT DOCUMENTS

| | | | | |
|---|---|---|---|---|
| CN | 102686403 | A | | 9/2012 |
| CN | 103079831 | A | | 5/2013 |
| JP | H06079970 | A | | 3/1994 |
| JP | H07-186554 | A | | 7/1995 |
| JP | H08267935 | A | * | 10/1996 |
| JP | 2000221620 | A | * | 8/2000 |
| JP | 2001001645 | A | * | 1/2001 |
| JP | 2003-266941 | A | | 9/2003 |
| JP | 2004-188829 | A | | 7/2004 |
| JP | 2005199494 | A | | 7/2005 |
| JP | 2011-116116 | A | | 6/2011 |
| JP | 2018079672 | A | | 5/2018 |
| WO | WO-2006030654 | A | | 3/2006 |
| WO | 2018/092455 | A | | 5/2018 |
| WO | 2018/092489 | A | | 5/2018 |

* cited by examiner

[ FIG. 1 ]
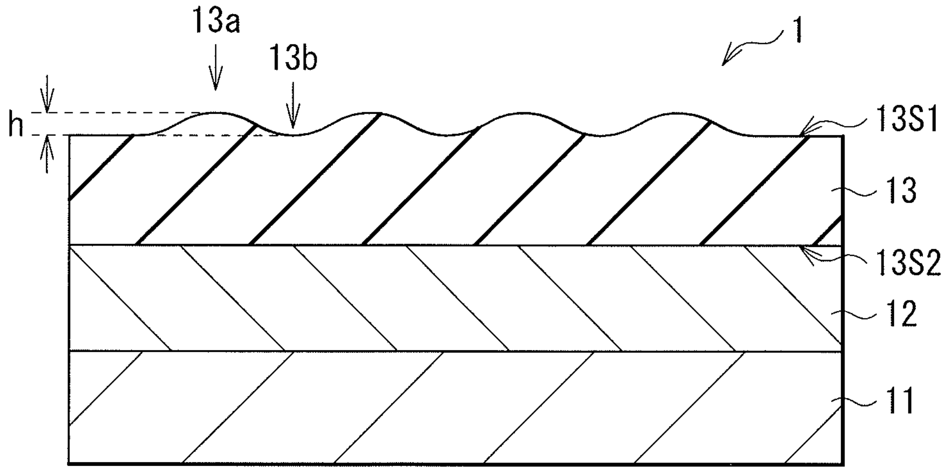
[ FIG. 2 ]
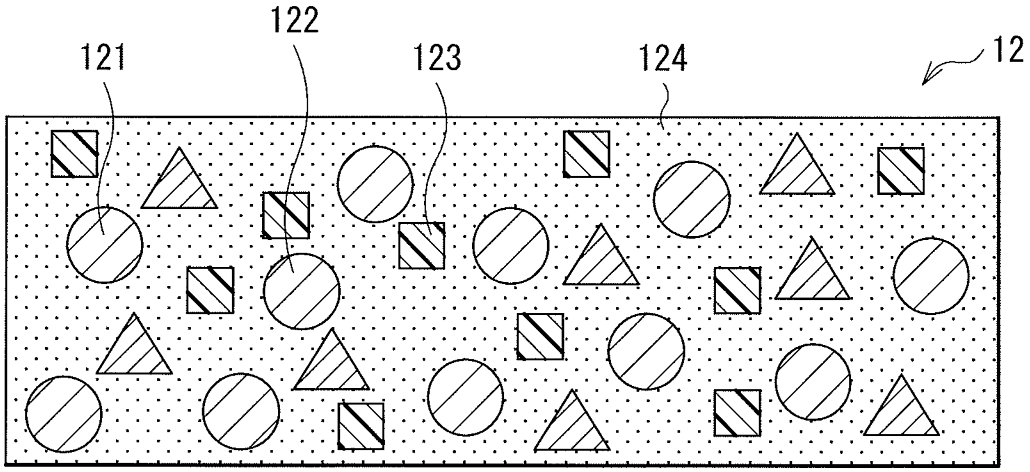
[ FIG. 3A ]
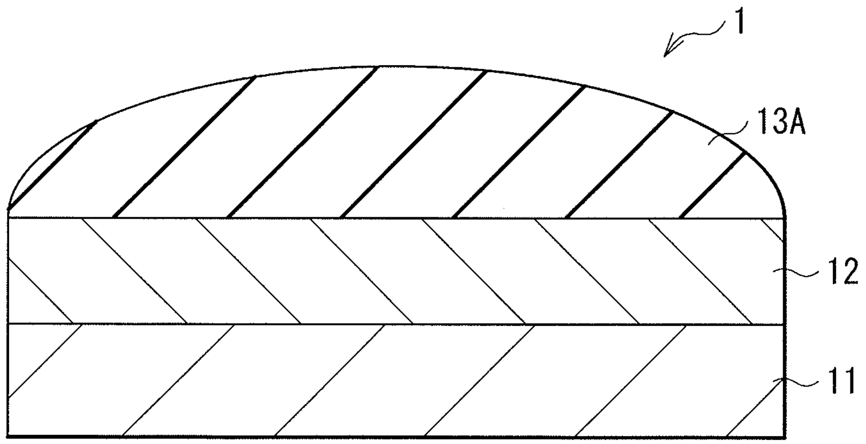

[ FIG. 3B ]
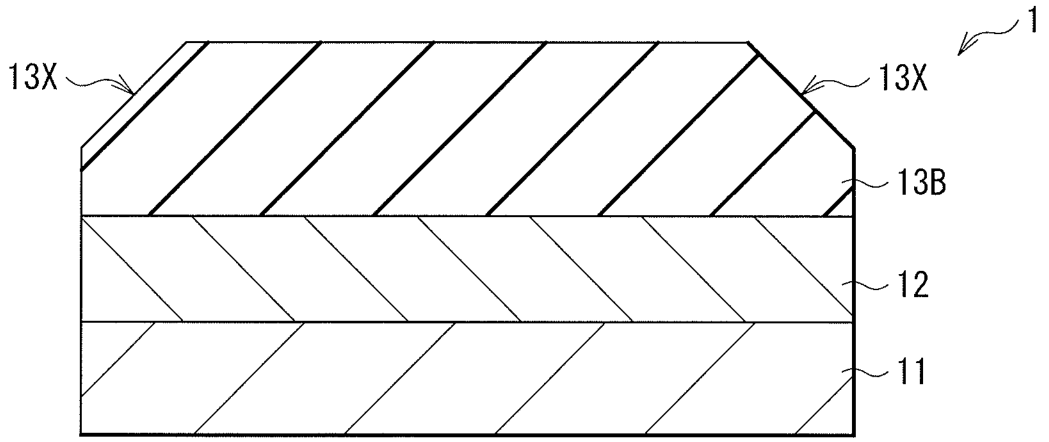
[ FIG. 3C ]
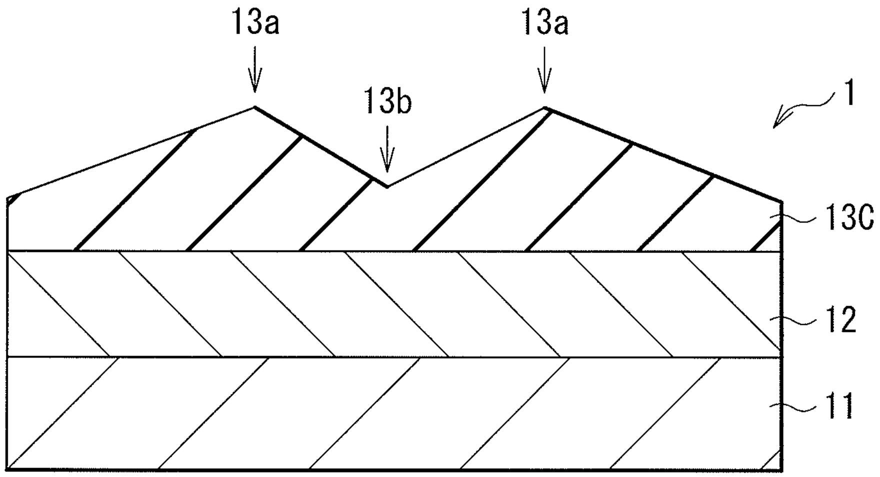
[ FIG. 3D ]
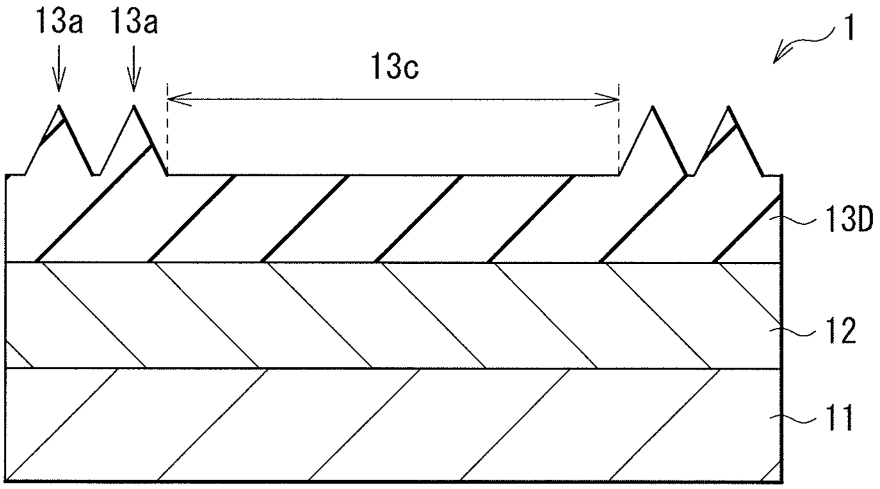

[ FIG. 4A ]
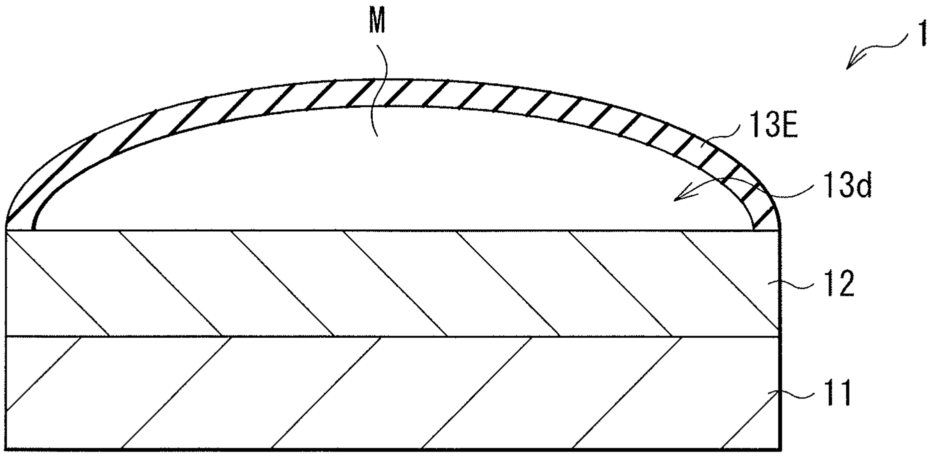
[ FIG. 4B ]
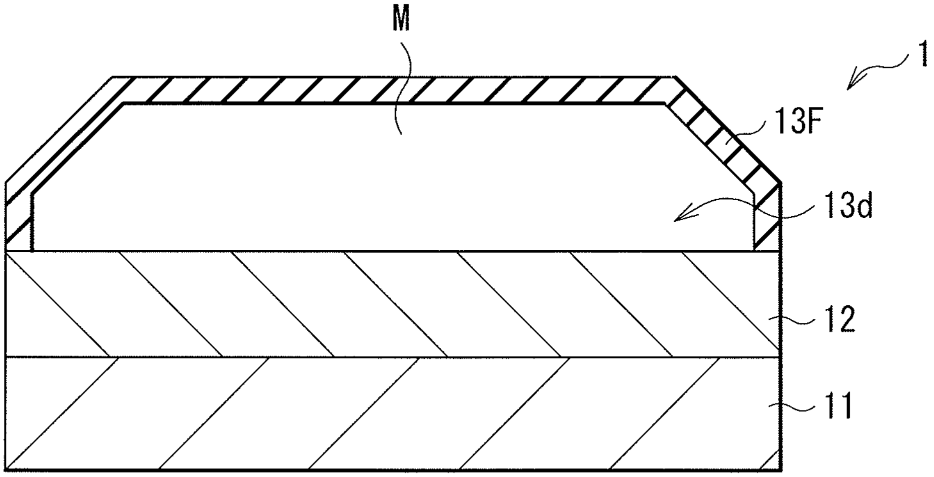
[ FIG. 4C ]
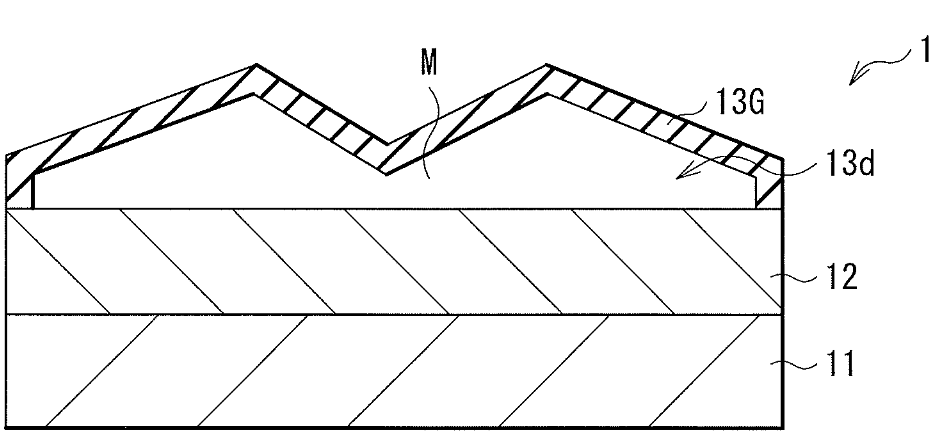

[ FIG. 5 ]
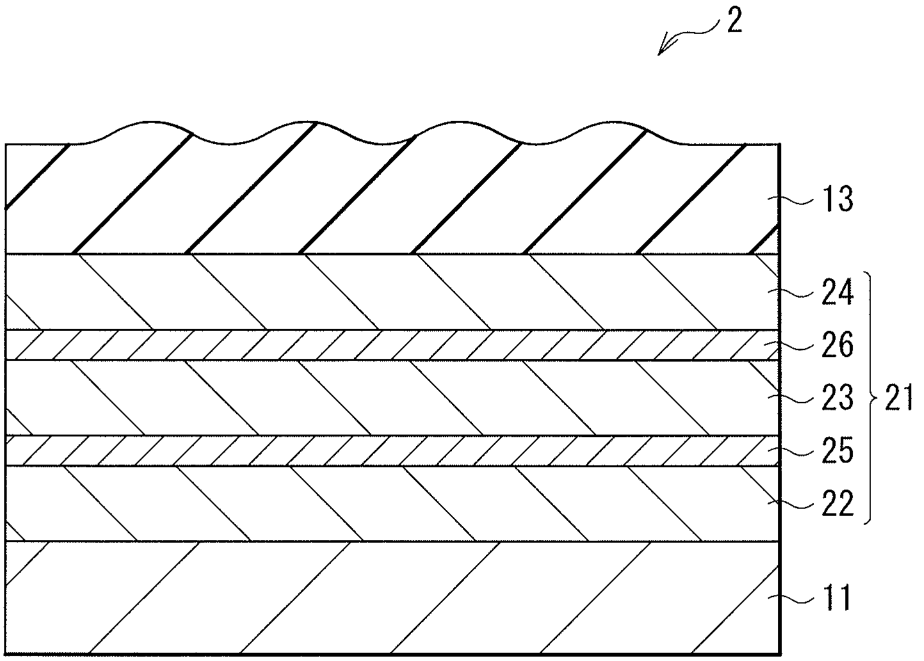
[ FIG. 6 ]
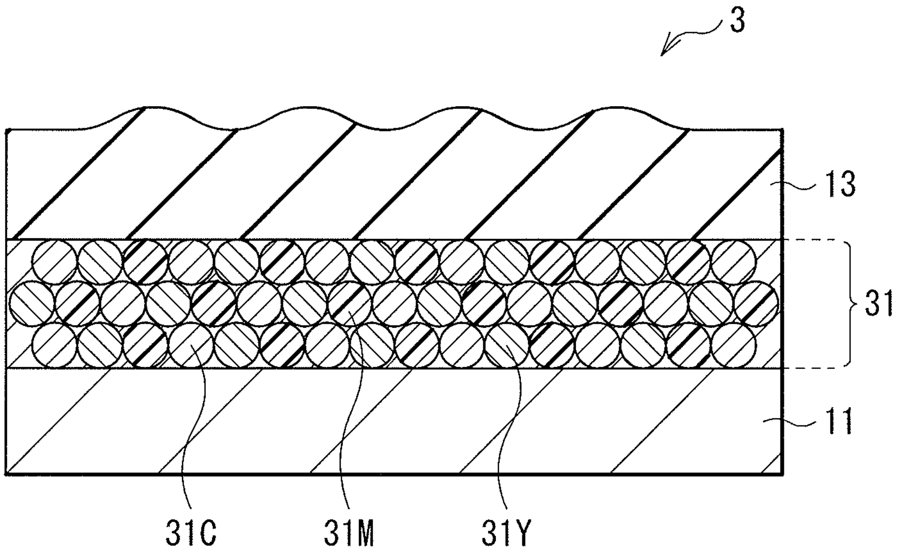

[ FIG. 7 ]
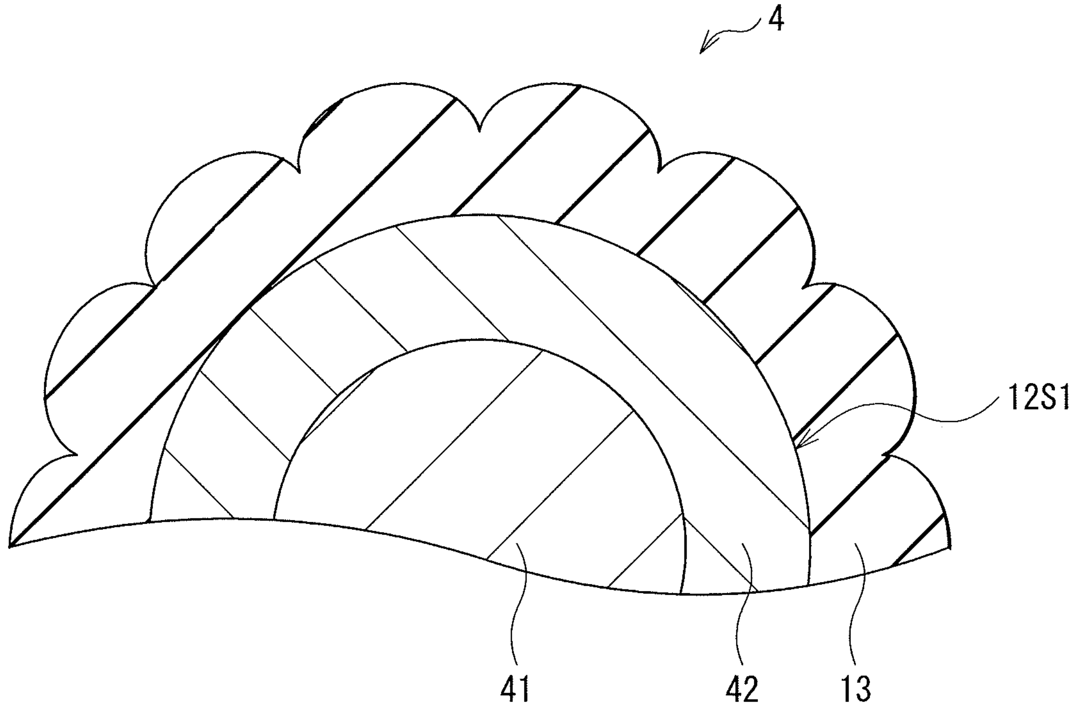
[ FIG. 8 ]
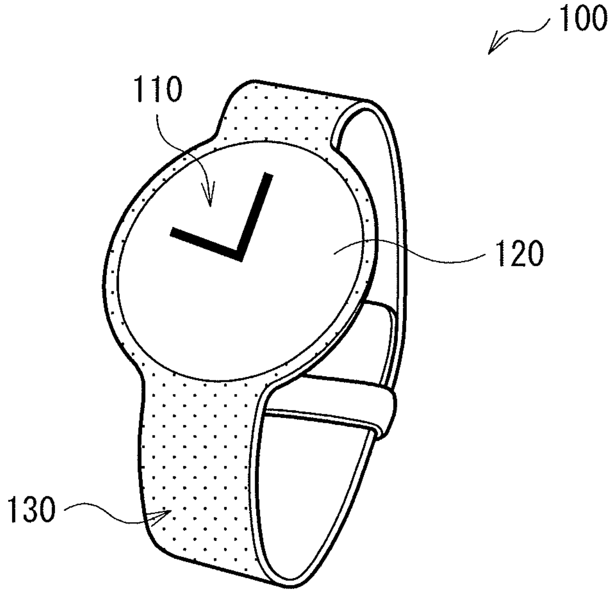

[ FIG. 9A ]
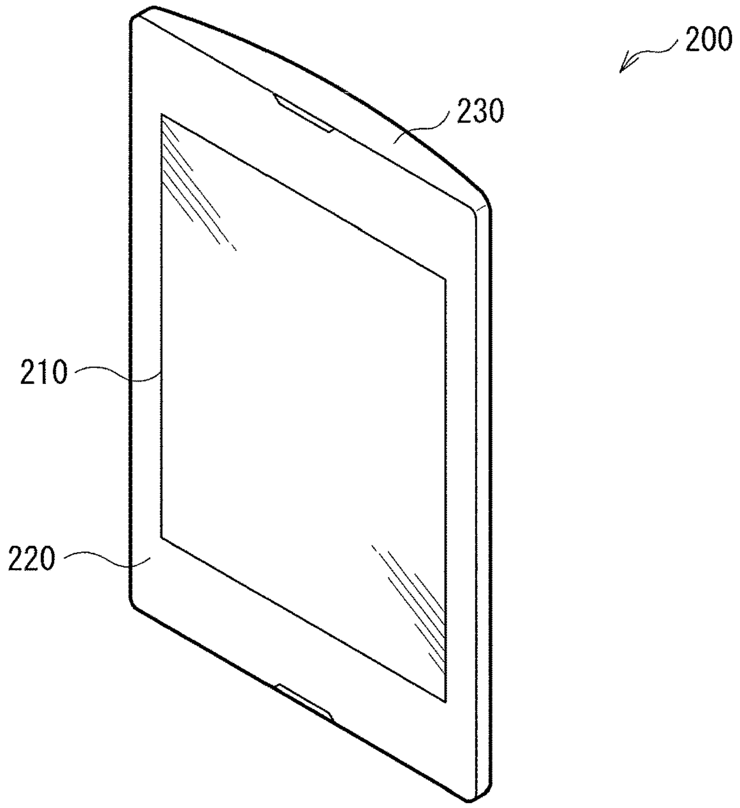
[ FIG. 9B ]
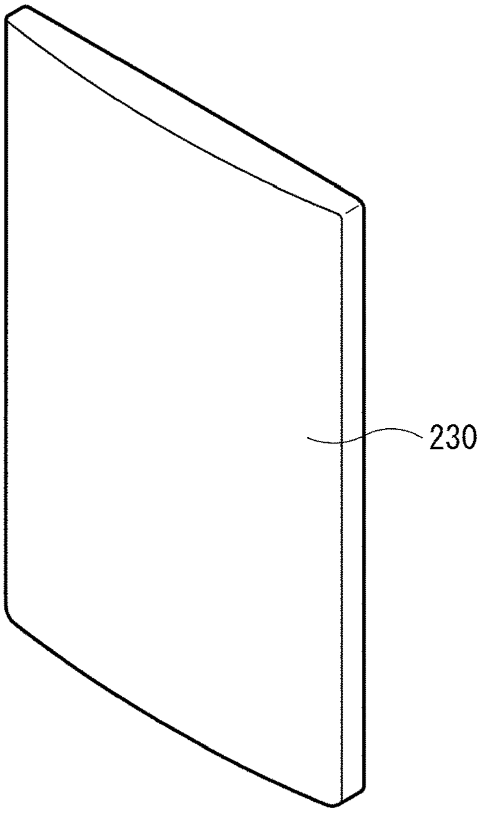

[ FIG. 10A ]
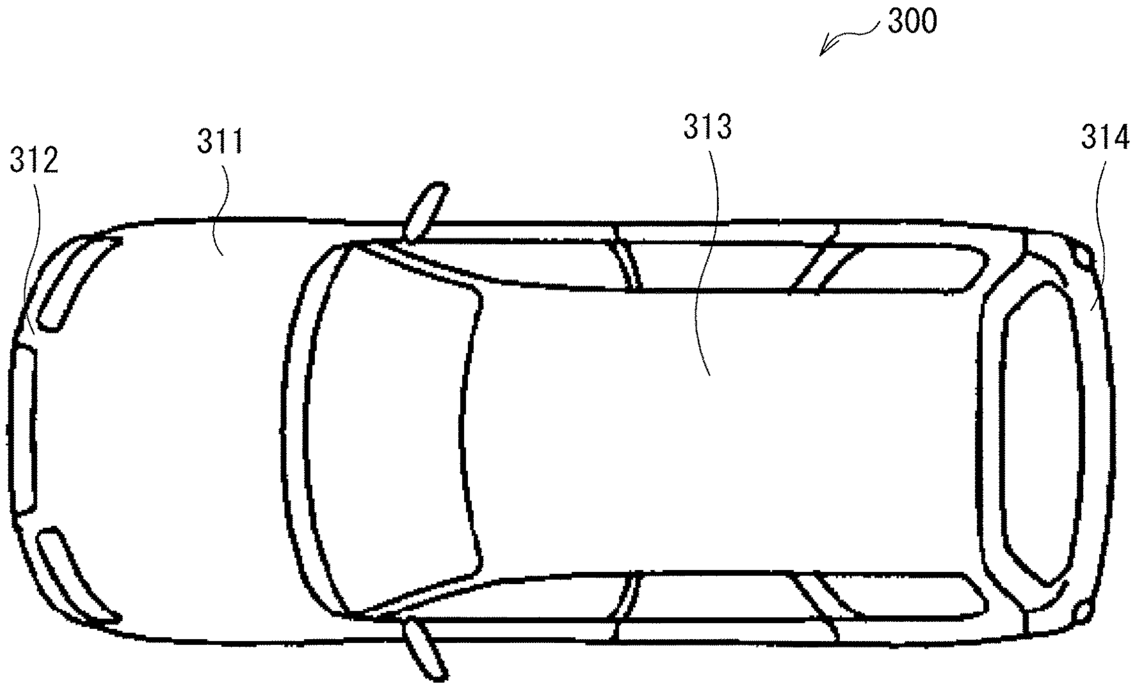
[ FIG. 10B ]
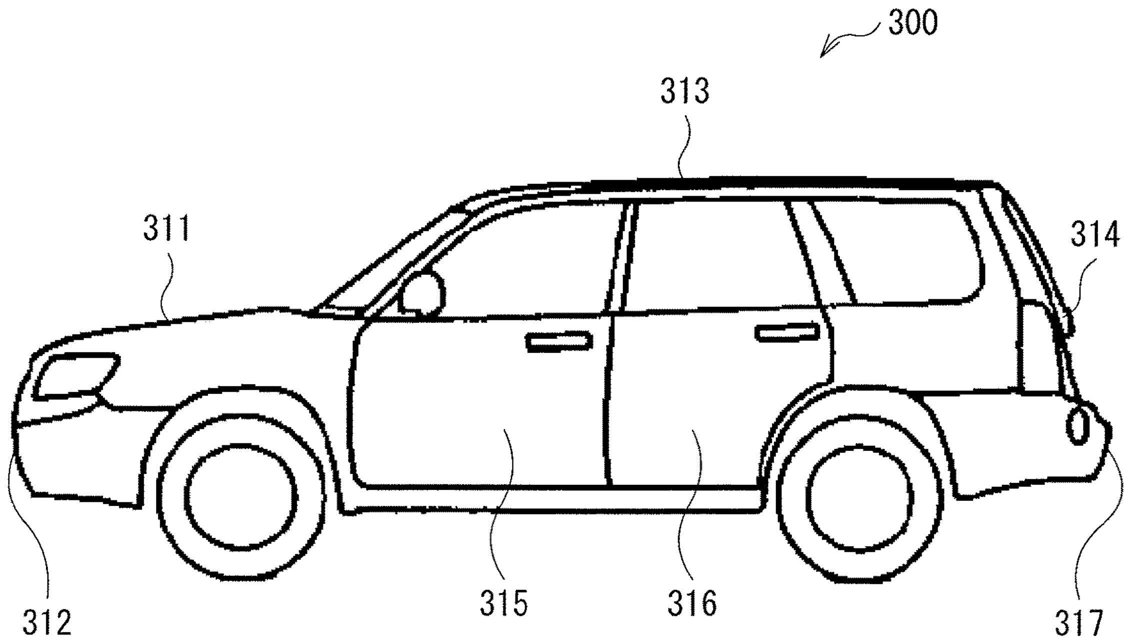

[ FIG. 11 ]
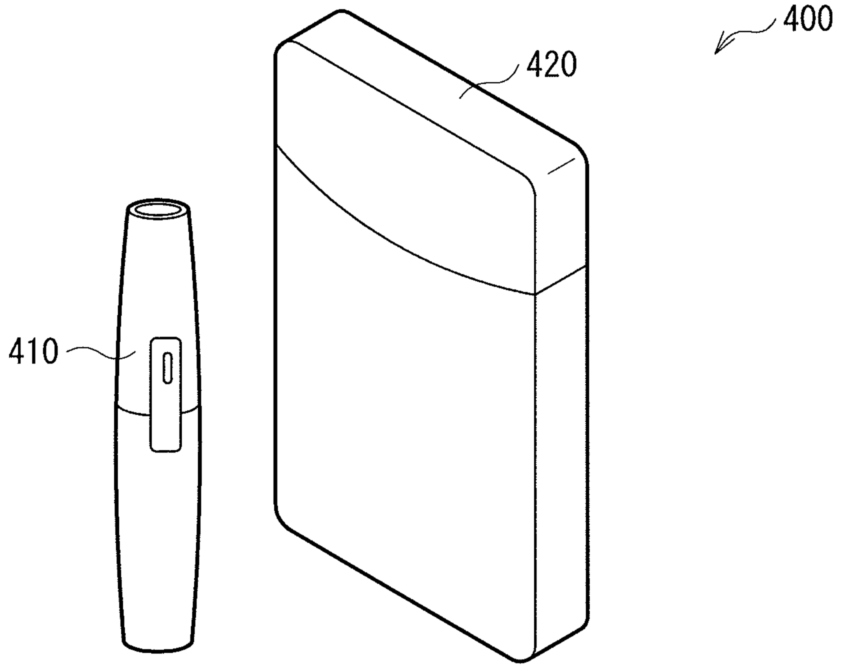
[ FIG. 12 ]
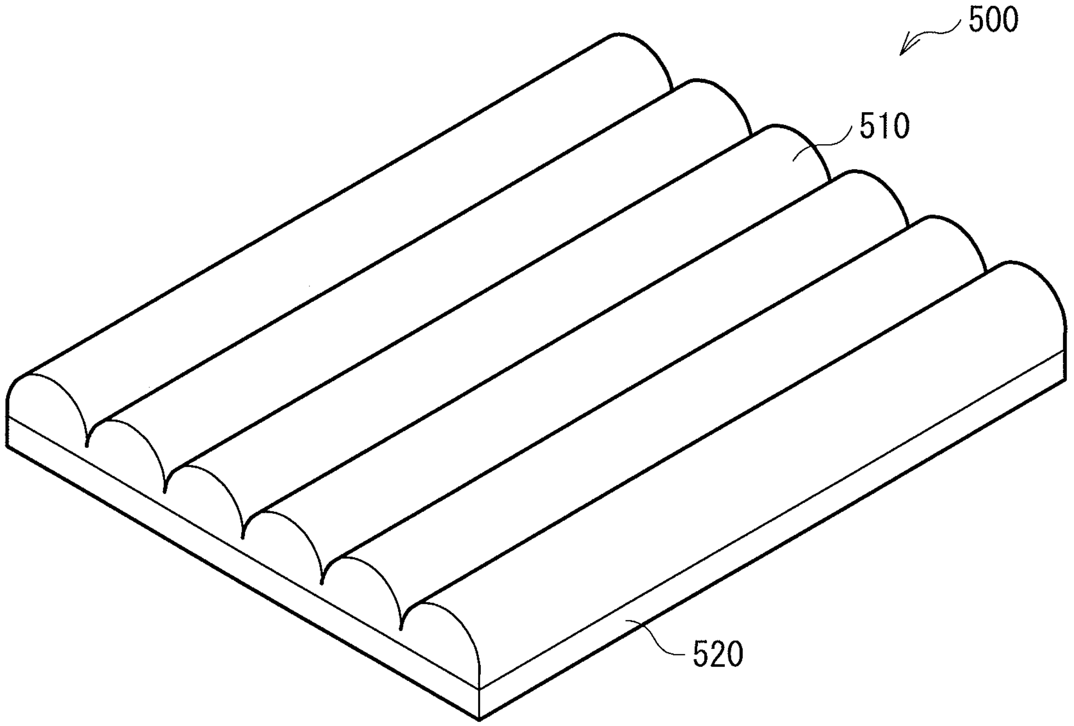

THERMOSENSITIVE RECORDING MEDIUM AND EXTERIOR MEMBER

TECHNICAL FIELD

The present disclosure relates to a thermosensitive recording medium that contains, for example, a leuco dye as a coloring compound, and an exterior member that includes such a thermosensitive recording medium.

BACKGROUND ART

In recent years, development of so-called on-demand decorating techniques of a non-contact method has been advanced to meet increasing customer needs for customization. For example, PTL 1 discloses, as an example of a thermosensitive recording medium, a reversible multicolor recording medium that includes at least one or more rewritable layers. Each rewritable layer varies two states of transparency and coloration in a reversible manner with changes in temperature, and uses a leuco dye as a coloring compound.

CITATION LIST

Patent Literature

PTL 1: Japanese Unexamined Patent Application Publication No. 2003-266941

SUMMARY OF THE INVENTION

Incidentally, the thermosensitive recording medium has been used for a prepaid transportation IC card, a logistics barcode label, and the like in most cases; however, durability has been desired in a case where such a recording medium is used for an exterior of a smartphone, an electronic cigarette, and the like as a decorating application.

It is desirable to provide a thermosensitive recording medium and an exterior member that make it possible to improve the durability.

A thermosensitive recording medium according to an embodiment of the present disclosure includes: a recording layer that includes a coloring compound having electron-donating property, a developer having electron-accepting property, a photothermal conversion agent, and a polymer material; and a protective member that is stacked on the recording layer, and has a convexo-concave shape in a plane.

An exterior member according to an embodiment of the present disclosure is provided with the above-described thermosensitive recording medium according to the embodiment of the present disclosure on at least one surface of a supporting base material.

In the thermosensitive recording medium according to the embodiment of the present disclosure, and the exterior member according to the embodiment of the present disclosure, the protective member having the convexo-concave shape in the plane is stacked on the recording layer that includes the coloring compound, the developer, the photothermal conversion agent, and the polymer material. This results in reduction in the contact area between another member and a front surface of the thermosensitive recording medium.

BRIEF DESCRIPTION OF DRAWINGS

FIG. 1 is a cross-sectional schematic view of an example of a configuration of a thermosensitive recording medium according to an embodiment of the present disclosure.

FIG. 2 is a schematic view describing a configuration of a recording layer illustrated in FIG. 1.

FIG. 3A is a cross-sectional schematic view of another example of the configuration of the thermosensitive recording medium according to the embodiment of the present disclosure.

FIG. 3B is a cross-sectional schematic view of another example of the configuration of the thermosensitive recording medium according to the embodiment of the present disclosure.

FIG. 3C is a cross-sectional schematic view of another example of the configuration of the thermosensitive recording medium according to the embodiment of the present disclosure.

FIG. 3D is a cross-sectional schematic view of another example of the configuration of the thermosensitive recording medium according to the embodiment of the present disclosure.

FIG. 4A is a cross-sectional schematic view of another example of the configuration of the thermosensitive recording medium according to the embodiment of the present disclosure.

FIG. 4B is a cross-sectional schematic view of another example of the configuration of the thermosensitive recording medium according to the embodiment of the present disclosure.

FIG. 4C is a cross-sectional schematic view of another example of the configuration of the thermosensitive recording medium according to the embodiment of the present disclosure.

FIG. 5 is a cross-sectional schematic view of an example of a configuration of a thermosensitive recording medium according to a modification example 1 of the present disclosure.

FIG. 6 is a cross-sectional schematic view of an example of a configuration of a thermosensitive recording medium according to a modification example 2 of the present disclosure.

FIG. 7 is a cross-sectional schematic view of an example of a configuration of a thermosensitive recording medium according to a modification example 3 of the present disclosure.

FIG. 8 is a perspective view of an example of an external appearance of an application example 1.

FIG. 9A is a perspective view of an example of an external appearance (front surface side) of an application example 2.

FIG. 9B is a perspective view of an example of an external appearance (rear surface side) of the application example 2.

FIG. 10A is a perspective view of an example of an external appearance (top surface) of an application example 3.

FIG. 10B is a perspective view of an example of an external appearance (side surface) of the application example 3.

FIG. 11 is a perspective view of an example of an application example 4.

FIG. 12 is a perspective view of an example of a configuration of an application example 5.

MODES FOR CARRYING OUT THE INVENTION

Hereinafter, some embodiments of the present disclosure are described in detail with reference to the drawings. The following description is merely a specific example of the present disclosure, and the present disclosure is not limited to the following embodiments. Further, the present disclosure is not limited to arrangements, dimensions, dimension ratios, and the like of each of components illustrated in the drawings. It is to be noted that descriptions are given in the following order.

1. Embodiment (a thermosensitive recording medium having a convexo-concave shape on a front surface of a protective member)
    1-1. Configuration of Thermosensitive Recording Medium
    1-2. Method of Manufacturing Thermosensitive Recording Medium
    1-3. Method of Recording in Thermosensitive Recording Medium
    1-4. Workings and Effects
2. Modification Examples
    2-1. Modification Example 1 (an example where a plurality of recording layers is stacked)
    2-2. Modification Example 2 (an example where a plurality of kinds of coloring compounds is contained in a recording layer)
    2-3. Modification Example 3 (an example where a surface of a recording layer has a curvature)
3. Application Examples

1. EMBODIMENT

FIG. 1 illustrates a cross-sectional configuration of a thermosensitive recording medium (a thermosensitive recording medium 1) according to an embodiment of the present disclosure. FIG. 2 schematically illustrates each of materials that configure a recording layer 12. The thermosensitive recording medium 1 of the present embodiment is a reversible recording medium that makes it possible to record and erase information by heat in a reversible manner, and is configured, for example, in such a manner that a protective member 13 having a convexo-concave shape in a plane is stacked on the recording layer 12 that is provided on a supporting base material 11 to allow for varying a recording state and an erasing state in the reversible manner. It is to be noted that FIG. 1 schematically illustrates the cross-sectional configuration of the thermosensitive recording medium 1, and an illustration in FIG. 1 differs from an actual configuration in dimensions and shape in some cases.

(1-1. Configuration of Thermosensitive Recording Medium)

The supporting base material 11 serves to support the recording layer 12. The supporting base material 11 includes, for example, a material that is superior in terms of thermal resistance and dimensional stability in a planar direction. The supporting base material 11 may have either characteristics of light-transmissive property and non-light-transmissive property. For example, the supporting base material 11 may be a substrate having the rigidity, such as a wafer, or may include thin-layer glass, film, paper, or any other material that has the flexibility. The use of a flexible substrate as the supporting base material 11 makes it possible to achieve a flexible (foldable) thermosensitive recording medium.

Examples of a constituent material for the supporting base material 11 include an inorganic material, a metallic material, a polymer material such as plastics, and the like. Specifically, examples of the inorganic material include silicon (Si), silicon oxide ($SiO_x$), silicon nitride ($SiN_x$), aluminum oxide ($AlO_x$), magnesium oxide ($MgO_x$), and the like. The silicon oxide includes glass or spin-on glass (SOG), etc. Examples of the metallic material include a metal simple substance, such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), and lead (Pb), or alloy containing two or more kinds of these materials. Specific examples of the alloy include stainless steel (SUS), aluminum alloy, magnesium alloy, titanium alloy, and the like. Examples of the polymer material include phenolic resin, epoxy resin, melamine resin, urea resin, unsaturated polyester resin, alkyd resin, urethane resin, polyimide, polyethylene, high-density polyethylene, medium-density polyethylene, low-density polyethylene, polypropylene, polyvinyl chloride (PVC), polyvinylidene chloride, polystyrene, polyvinyl acetate, polyurethane, acrylonitrile-butadiene-styrene resin (ABS), acrylic resin (PMMA), polyamide, nylon, polyacetal, polycarbonate (PC), modified polyphenylene ether, polyethylene terephthalate (PET), polybutylene terephthalate, cyclic polyolefin, polyphenylene sulfide, polytetrafluoroethylene (PTFE), polysulfone, polyether sulfone, amorphous polyarylate, liquid-crystalline polymer, polyetheretherketone (PEEK), polyamide-imide, polyethylene naphthalate (PEN), triacetyl cellulose, cellulose, or a copolymer of these materials, fiberglass reinforced plastic, carbon fiber reinforced plastic (CFRP), and the like.

It is to be noted that a reflective layer (unillustrated) is preferably provided on an upper surface or a lower surface of the supporting base material 11. Providing the reflective layer allows for clearer color display.

The recording layer 12 makes it possible to record and erase information by heat in the reversible manner. The recording layer 12 is configured with use of a material that allows for stable repeated recording, and control of a decolored state and a colored state. Specifically, as illustrated in FIG. 2, the recording layer 12 is formed in such a manner that coloring compounds 121, developing/reducing agents 122 (developers), and photothermal conversion agents 123 are dispersed in a polymer material 124, for example. A film thickness (hereinafter simply referred to as a thickness) of the recording layer 12 is, for example, equal to or more than 1 μm and equal to or less than 10 μm.

Examples of the coloring compound 121 include a leuco dye. Examples of the leuco dye include a currently-available thermosensitive paper dye. Specific examples thereof include a compound that contains a group having, for example, the electron-donating property in a molecule, as illustrated in Formula (1) given below.

[Chem. 1]

(1)

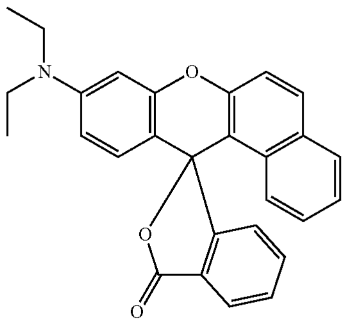

The coloring compound 121 is not specifically limited, and is selectable as appropriate in accordance with any purpose. In addition to the compound given in Formula (2) in the above, specific examples of a coloring compound include a fluoran-based compound, a triphenylmethanephthalide-based compound, an azaphthalide-based compound, a phenothiazine-based compound, a leucoauramine-based compound, an indolinophthalide-based compound, and the like. Other additional examples include 2-anilino-3-methyl-6-diethylaminofluoran, 2-anilino-3-methyl-6-di-(n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluoromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylanilino)fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino)fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylanilino)fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino)fluoran, 2-diethylamino-6-(N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino)fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino)fluoran, 1,2-benzo-6-(N-ethyl-N-toluidino)fluoran, and the like. As the coloring compound 121, the recording layer 12 may use a single kind of any of the above-described compounds alone, or may use two or more kinds of any of those in combination.

The developing/reducing agent 122 is intended, for example, to color a colorless coloring compound, or to decolor the coloring compound that exhibits a predetermined color. Examples of the developing/reducing agent 122 include a phenol derivative, a salicylic acid derivative, a urea derivative, and the like. Specific examples thereof include a compound that has a salicylic acid skeleton illustrated in General Formula (2) given below, and that contains a group having the electron-accepting property in a molecule.

[Chem. 2]

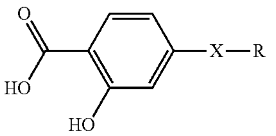

(2)

(X is any of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—. R is a hydrocarbon group.)

Other additional examples of the developing/reducing agent 122 include 4,4'-isopropylidenebisphenol, 4,4'-isopropylidenebis(o-methylphenol), 4,4'-secondary-butylidenebisphenol, 4,4'-isopropylidenebis(2-tertiary-butylphenol), p-zinc nitrobenzoate, 1,3,5-tris(4-tertiary-butyl-3-hydroxy-2,6-dimethylbenzipisocyanuric acid, 2,2-(3,4'-dihydroxydiphenyl)propane, bis(4-hydroxy-3-methylphenyl) sulfide, 4-{β-(p-methoxyphenoxy)ethoxy}salicyc acid, 1,7-bis(4-hydroxyphenylthio)-3,5-dioxaheptane, 1,5-bis(4-hydroxyphenylthio)-5-oxapentane, monobenzyl ester monocalcium salt phthalate, 4,4'-cyclohexylidenediphenol, 4,4'-isopropylidenebis(2-chlorophenol), 2,2'-methylenebis(4-methyl-6-tertiary-butylphenol), 4,4'-butylidenebis(6-tertiary-butyl-2-methyl)phenol, 1,1,3-tris(2-methyl-4-hydroxy-5-tertiary-butylphenyl)butane, 1,1,3-tris(2-methyl-4-hydroxy-5-cyclohexylphenyl)butane, 4,4'-thiobis(6-tertiary-butyl-2-methyl)phenol, 4,4'-diphenolsulfone, 4-isopropoxy-4'-hydroxydiphenylsulfone (4-hydroxy-4'-isopropoxydiphenylsulfone), 4-benzyloxy-4'-hydroxydiphenylsulfone, 4,4'-diphenolsulfoxide, p-isopropyl hydroxybenzoate, p-benzyl hydroxybenzoate, benzyl protocatechuate, stearyl gallate, lauryl gallate, octyl gallate, 1,3-bis(4-hydroxyphenylthio)-propane, N,N'-diphenylthiourea, N,N'-di-(m-chlorophenyl)thiourea, salicylanilide, bis(4-hydroxyphenyl)methyl ester acetate, bis(4-hydroxyphenyl)benzyl ester acetate, 1,3-bis(4-hydroxycumyl)benzene, 1,4-bis(4-hydroxycumyl)benzene, 2,4'-diphenolsulfone, 2,2'-diallyl-4,4'-diphenolsulfone, 3,4-dihydroxyphenyl-4'-methyldiphenylsulfone, 1-acetyloxy-2-zinc naphthoate, 2-acetyloxy-1-zinc naphthoate, 2-acetyloxy-3-zinc naphthoate, α,α-bis(4-hydroxyphenyl)-α-methyl toluene, an antipyrine complex of zinc thiocyanate, tetrabromobisphenol A, tetrabromobisphenol S, 4,4'-thiobis (2-methylphenol), 4,4'-thiobis(2-chlorophenol), dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, octacosylphosphonic acid, α-hydroxydodecylphosphonic acid, α-hydroxytetradecylphosphonic acid, α-hydroxyhexadecylphosphonic acid, α-hydroxyoctadecylphosphonic acid, α-hydroxyeicosylphosphonic acid, α-hydroxydocosylphosphonic acid, α-hydroxytetracosylphosphonic acid, dihexadecyl phosphate, dioctadecyl phosphate, dieicosyl phosphate, didocosyl phosphate, monohexadecyl phosphate, monooctadecyl phosphate, monoeicosyl phosphate, monodocosyl phosphate, methylhexadecyl phosphate, methyloctadecyl phosphate, methyleicosyl phosphate, methyldocosyl phosphate, amylhexadecyl phosphate, octylhexadecyl phosphate, laurylhexadecyl phosphate, and the like. As the developing/reducing agent 122, the recording layer 12 may use a single kind of any of the above-described compounds alone, or may use two or more kinds of any of those in combination.

The photothermal conversion agent 123 is intended, for example, to absorb light at a predetermined wavelength band in a near-infrared region to generate heat. As the photothermal conversion agent 123, it is preferable to use, for example, a near-infrared absorbing dye that has an absorption peak within the range of equal to or more than 700 nm and equal to or less than 2000 nm in wavelength and hardly has any absorption in a visible region. Specific examples thereof include a compound having a cyanine skeleton (a cyanine-based dye), a compound having a phthalocyanine skeleton (a phthalocyanine-based dye), a compound having a naphthalocyanine skeleton (a naphthalocyanine-based dye), a compound having a squarylium skeleton (a squarylium-based dye), a metallic complex such as a dithioic complex, diimonium salt, aminium salt, an inorganic compound, and the like. Examples of the inorganic compound include a graphite; a carbon black; a metallic powder particle; a metallic oxide such as a tricobalt tetraoxide, an iron oxide, a chromium oxide, a copper oxide, a titanium black, and an ITO; a metallic nitride such as a niobium nitride; a metallic carbide such as a tantalum carbide; a metallic sulfide; various magnetic powders; and the like.

The polymer material 124 preferably makes it easy to homogeneously disperse the coloring compound 121, the developing/reducing agent 122, and the photothermal conversion agent 123, as illustrated in FIG. 2. Examples of the polymer material 124 include thermosetting resin and thermoplastic resin. Specific examples thereof include polyvinyl chloride, polyvinyl acetate, a vinyl chloride-vinyl acetate copolymer, ethyl cellulose, polystyrene, a styrene-based copolymer, phenoxy resin, polyester, aromatic polyester, polyurethane, polycarbonate, polyacrylic acid ester, polymethacrylic acid ester, an acrylate-based copolymer, a maleate-based polymer, a cycloolefin copolymer, polyvinyl alcohol, modified polyvinyl alcohol, polyvinyl butyral, polyvinyl phenol, polyvinyl pyrrolidone, hydroxyethyl cellulose, carboxymethyl cellulose, starch, phenol resin, epoxy resin, melamine resin, urea resin, unsaturated polyester resin, alkyd resin, urethane resin, polyarylate resin, polyimide, polyamide, polyamide-imide, and the like. The above-described polymer materials may be used in a cross-linking manner.

The recording layer 12 includes one or more kinds of each of the coloring compound 121, the developing/reducing agent 122, and the photothermal conversion agent 123. A layer that includes the coloring compound 121 and the developing/reducing agent 122, and a layer that includes the photothermal conversion agent 123 may be formed separately. Further, in addition to the above-described materials, the recording layer 12 may include, for example, a variety of additive agents such as a sensitizer and an ultraviolet absorber.

The protective member 13 is intended to protect a surface of the recording layer 12. The protective member 13 of the present embodiment has a convexo-concave shape in a plane of a front surface thereof (a surface 13S1) as described above, and a distance from the front surface (the surface 13S1) of the protective member 13 to the recording layer 12 in the plane is different at any in-plane position. The convexo-concave shape of the protective member 13 may have, for example, a curvature in the plane, and such a shape may be in a wavy form in which a plurality of convex portions **13*a* and a plurality of concave portions 13*b* are combined as illustrated in FIG. 1, or a whole front surface thereof may be a single spherical surface like a protective member 13A illustrated in FIG. 3A, for example. Alternatively, the convexo-concave shape of the protective member 13 may be a form in which a notch 13X is provided at a circumferential edge portion as seen in a protective member 13B illustrated in FIG. 3B, or may be a form in which two or more convex portions 13*a* that include straight lines having different angles, and one concave portion 13*b* are combined as seen in a protective member 13C illustrated in FIG. 3C. Further, the convexo-concave shape of the protective member 13 may be a form in which a plurality of convex portions 13*a* and a linear region 13*c* that configures a flat surface parallel to the surface of the recording layer 12 are combined as seen in a protective member 13D illustrated in FIG. 3D. In addition, the protective member 13 may be provided with a concave portion 13*d* that forms a hollow structure M between the recording layer 12 and the protective member 13 on a rear surface (13S2) of the protective member 13 that faces the recording layer 12, as illustrated in FIG. 4A to FIG. 4**C, for example.

The protective member 13 has, for example, a thickness of 50 μm or more, and more preferably 20 μm or more. An upper limit does not matter specifically; however, such a limit is, for example, 10 mm or less. A difference (h) between the convex portion **13*a* and the concave portion 13*b* that configure the convexo-concave shape of the front surface (the surface 13S1) of the protective member 13** is, for example, equal to or more than 100 μm and equal to or less than 7 mm.

The protective member 13 includes a material having light-transmissive property, and examples of a constituent material thereof include a polymer material such as plastics, an inorganic material, and the like. Specifically, examples of the polymer material include acrylic resin, polycarbonate (PC), acrylonitrile butadiene styrene resin (ABS), polyethylene terephthalate (PET), polyvinyl chloride (PVC), polypropylene (PP), polystyrene (PS), melamine resin, and epoxy resin or a copolymer of such materials, and the like. Examples of the inorganic material include a silicon oxide ($SiO_x$) including a material such as glass or sapphire glass, and the like.

Further, the protective member 13 may include an ultraviolet absorber or the like that has absorption at a wavelength band of 420 nm or less, for example.

It is to be noted that, on a lower surface of the recording layer 12, a layer including, for example, a gluing agent, an adhesive agent, or the like is provided (such a layer is unillustrated), and the recording layer 12 is bonded on the supporting base material 11 with such a layer in between.

(1-2. Method of Manufacturing Thermosensitive Recording Medium)

It is possible to manufacture the thermosensitive recording medium 1 of the present embodiment using, for example, a coating method. It is to be noted that a manufacturing method described below is merely an example, and the thermosensitive recording medium 1 may be manufactured using any other methods.

Initially, as a polymer material, for example, poly(vinyl chloride-co-vinyl acetate (9:1)) is dissolved in a solvent (for example, methyl ethyl ketone). A developing/reducing agent, a coloring compound, and a photothermal conversion agent are added and dispersed in such a solution. This provides a coating material for a thermosensitive recording medium. Subsequently, the resultant coating material for the thermosensitive recording medium is applied on the supporting base material 11 with a thickness of, for example, 3 μm, and is dried at temperature of, for example, 70° C. to form the recording layer 12. Next, the protective member 13 having the convexo-concave shape on the front surface (the surface 13S1) that is formed using, for example, an in-mold casting or any other method is bonded on the recording layer 12 with, for example, a hot melt, a gluing agent, an adhesive agent, or the like in between.

It is to be noted that the protective member 13 may not be bonded on the recording layer 12, and the recording layer 12 may be fixed on the protective member 13 using, for example, a fixing member. Further, the recording layer 12 may be formed using a method other than the above-described coating method. For example, a film may be preliminarily applied on another base material, and such a film may be bonded on the supporting base material 11 with, for example, an adhesive film in between to form the recording layer 12. Alternatively, the recording layer 12 may be formed by immersing the supporting base material 11 in the coating material.

(1-3. Method of Recording in Thermosensitive Recording Medium)

In the thermosensitive recording medium 1 of the present embodiment, it is possible to perform recording in the following manner, for example.

Using, for example, a semiconductor laser or the like, a desired position of the recording layer 12 is irradiated with near-infrared light whose wavelength and output are adjusted. This causes the photothermal conversion agent that is included in the recording layer 12 and has absorption at the relevant wavelength to generate heat. As a result, color reaction (coloring reaction) arises between the coloring compound and the developing/reducing agent, leading to coloring of a portion irradiated with the near-infrared light.

In contrast, adjustment of laser irradiation conditions also allows a colored portion to be decolored.

It is to be noted that, in the thermosensitive recording medium 1 of the present embodiment, a colored state and a decolored state are held unless the coloring reaction and decoloring reaction such as irradiation with the near-infrared light and heating as described above are performed.

(1-4. Workings and Effects)

As described previously, the development of the on-demand decorating techniques has been advanced to meet increasing customer needs for customization. As one of such techniques, a thermosensitive recording medium that allows for recording of information by heating a desired region in a non-contact manner using a laser has drawn the attention. The thermosensitive recording medium includes, for example, a coloring compound having electron-donating property, a developer having electron-accepting property, and a matrix polymer. Further, by additionally including a photothermal conversion agent, the thermosensitive recording medium allows for recording by being irradiated with light of a specified wavelength. In addition to, for example, printing on a prepaid transportation IC card and a barcode label, etc., the above-described thermosensitive recording medium is supposed to be used for applications including decoration of casing surfaces of an electronic apparatus such as a smartphone, and an electronic cigarette, etc., as well as an interior and an exterior of a building, and the like.

The thermosensitive recording medium is provided with a recording layer that includes, for example, a leuco dye, and a protective layer having a thickness of, for example, about 0.1 μm to about 20 μm is provided on a surface of the recording layer. Such a thermosensitive recording medium is typically provided on a flat-surface member. Therefore, a front surface of the thermosensitive recording medium also becomes flat, which causes an issue that the front surface thereof is susceptible to damage due to contact with another member.

In contrast, in the present embodiment, the protective member 13 having a convexo-concave shape in a plane is stacked on the recording layer 12 that is configured in such a manner that the coloring compound 121, the developing/reducing agent 122, and the photothermal conversion agent 123 are dispersed in the polymer material 124. This makes it possible to reduce the contact area between another member and the front surface of the thermosensitive recording medium 1.

As described above, in the thermosensitive recording medium 1 of the present embodiment, the protective member 13 having the convexo-concave shape in the plane is stacked on the recording layer 12 that includes the coloring compound 121, resulting in reduction in the contact area between the protective member 13 and another member. This makes it possible to improve the durability of the front surface.

Further, a typical thermosensitive recording medium with a flat front surface causes an issue that a scratch due to contact with any other member, dirt such as a fingerprint, and the like are easily noticeable, leading to a high likelihood of deterioration in the display quality. In contrast, in the present embodiment, by providing the protective member 13 having the convexo-concave shape in the plane as described above, it is possible to improve scratch resistance and dirt resistance, and to make any scratch and dirt less noticeable. Further, it is possible to improve handling performance such as ease of holding.

In addition, in a case where a thermosensitive recording medium is used, for example, for a decorating application in portable apparatuses such as a smartphone and an electronic cigarette, physical durability such as robustness and shock resistance is desired in addition to the scratch resistance and the dirt resistance to avoid any damage when a great force is exerted at the time of falling or any other event. In contrast, in the thermosensitive recording medium 1 of the present embodiment, the protective member 13 uses a thick film of, for example, equal to or more than 200 μm and equal to or less than 10 mm in thickness, which allows for enhancement in the robustness and the shock resistance. Further, this makes it possible to freely design a front surface shape of the thermosensitive recording medium 1, which allows design to be improved.

Next, description is provided on modification examples (modification examples 1 to 3) of the present disclosure. Hereinafter, any components similar to those in the above-described embodiment are denoted with the same reference numerals, and the related descriptions are omitted as appropriate.

2. MODIFICATION EXAMPLES

2-1. Modification Example 1

FIG. 5 schematically illustrates a cross-sectional configuration of a thermosensitive recording medium (a thermosensitive recording medium 2) according to a modification example 1 of the present disclosure. For example, the thermosensitive recording medium 2 is configured in such a manner that, on the supporting base material 11, a recording layer 21 that allows for varying a recording state and an erasing state in a reversible manner is disposed, and differs from the above-described embodiment in that the recording layer 21 has a layered structure including a plurality of (here, three) layers (a first layer 22, a second layer 23, and a third layer 24). Thermal insulating layers 25 and 26 are respectively provided between the layers 22 and 23, and between the layers 23 and 24, each of which is the layer configuring the recording layer 21.

(2-1-1. Configuration of Thermosensitive Recording Medium)

The recording layer 21 makes it possible to record and erase information by heat in the reversible manner, and has a configuration in which, for example, the first layer 22, the second layer 23, and the third layer 24 are stacked in this order from the supporting base material 11 side, as described above. The first layer 22, the second layer 23, and the third layer 24 are formed in such a manner that coloring compounds 121 (121A, 121B, and 121C) that exhibit colors different from one another, developing/reducing agents 122 (122A, 122B, and 122C) that respectively correspond to the coloring compounds 121A, 121B, and 121C, and photothermal conversion agents 123 (123A, 123B, and 123C) that absorb light at wavelength bands different from one another to generate heat are dispersed in, for example, the polymer material 124.

Specifically, the first layer 22 includes a coloring compound that develops, for example, a cyan color (for example, the coloring compound 121A), a developing/reducing agent corresponding to such a coloring compound (for example, the developing/reducing agent 122A), and a photothermal conversion agent that absorbs and exhibits, for example, infrared light of a wavelength $\lambda_1$ (for example, the photothermal conversion agent 123A). The second layer 23 includes a coloring compound that exhibits, for example, a magenta color (for example, the coloring compound 121B), a developing/reducing agent corresponding to such a coloring compound (for example, the developing/reducing agent 122B), and a photothermal conversion agent that absorbs, for example, infrared light of a wavelength $\lambda_2$ to generate heat (for example, the photothermal conversion agent 123B). The third layer 24 includes a coloring compound that exhibits, for example, a yellow color (for example, the coloring compound 121C), a developing/reducing agent corresponding to such a coloring compound (for example, the developing/reducing agent 122C), and a photothermal conversion agent that absorbs, for example, infrared light of a wavelength $\lambda_3$ to generate heat (for example, the photothermal conversion agent 123C). The wavelengths $\lambda_1$, $\lambda_2$, and $\lambda_3$ are different from one another, leading to achievement of a display medium allowing for multicolor display.

It is to be noted that, for the photothermal conversion agents 123A, 123B, and 123C, a combination of materials whose light-absorbing bands are narrow, and do not overlap with respect to one another in the range of a wavelength of, for example, equal to or more than 700 nm and equal to or less than 2000 nm is preferably selected. This makes it possible to selectively color or decolor a desired layer among the first layer 22, the second layer 23, and the third layer 24.

Each of the first layer 22, the second layer 23, and the third layer 24 is preferably, for example, equal to or more than 1 μm and equal to or less than 20 μm in thickness, and is more preferably, for example, equal to or more than 2 μm and equal to or less than 15 μm in thickness. One reason for this is that, if each of the layers 22, 23, and 24 is less than 1 μm in thickness, there is a possibility that a sufficient color optical density will not be obtained. Further, another reason for this is that, if each of the layers 22, 23, and 24 is greater than 20 μm in thickness, there is a possibility that the heat utilization amount of each of the layers 22, 23, and 24 will increase, resulting in deterioration in the coloring property or decoloring property.

Further, the first layer 22, the second layer 23, and the third layer 24 may include a variety of additive agents such as, for example, a sensitizer and an ultraviolet absorber in addition to the above-described materials, as with the above-described recording layer 12.

Additionally, in the recording layer 21 of the present modification example, the thermal insulating layers 25 and 26 are respectively provided between the first layer 22 and the second layer 23, and between the second layer 23 and the third layer 24. Each of the thermal insulating layers 25 and 26 includes, for example, a typically available polymer material having the light-transmissive property. Examples of a specific material thereof include polyvinyl chloride, polyvinyl acetate, a vinyl chloride-vinyl acetate copolymer, ethyl cellulose, polystyrene, a styrene-based copolymer, phenoxy resin, polyester, aromatic polyester, polyurethane, polycarbonate, polyacrylic acid ester, polymethacrylic acid ester, an acrylate-based copolymer, a maleate-based polymer, polyvinyl alcohol, modified polyvinyl alcohol, hydroxyethyl cellulose, carboxymethyl cellulose, starch, and the like. It is to be noted that the thermal insulating layers 25 and 26 may include a variety of the additive agents such as, for example, the ultraviolet absorber. Further, each of the thermal insulating layers 25 and 26 may have a layered structure including a plurality of layers for the purpose of, for example, improving the adherence to the recording layer 21 or for any other purpose.

Alternatively, the thermal insulating layers 25 and 26 may include an inorganic material having the light-transmissive property. For example, the use of any of a silica, an alumina, a titanic, and a carbon each of which has the porous property, a complex of these materials, or the like is preferable because thermal conductivity is reduced, leading to an increase in a heat insulating effect. It is possible to form the thermal insulating layers 25 and 26 using, for example, a sol-gel method.

Each of the thermal insulating layers 25 and 26 is preferably, for example, equal to or more than 3 μm and equal to or less than 100 μm in thickness, and is more preferably, for example, equal to or more than 5 μm and equal to or less than 50 μm in thickness. One reason for this is that the adequate heat insulating effect is not obtained if a thickness of each of the thermal insulating layers 25 and 26 is too small, and the thermal conductivity deteriorates in uniformly heating the whole thermosensitive recording medium 2, or the light-transmissive property degrades if the thickness is too great.

It is possible to form a stacked film including the first layer 22, the thermal insulating layer 25, the second layer 23, the thermal insulating layer 26, and the third layer 24 using a typical film formation method, such as, for example, gravure coating, spray coating, spin coating, and slit coating. Other than these methods, a Wet-on-Wet method that performs continuous stacking, a Wet-on-Dry method that forms a subsequent layer every time drying of the present layer is completed, and a laminate method that bonds dry films together are also adoptable, and a stacking method is not specifically limited.

As with the above-described embodiment, the protective member 13 having a convexo-concave shape in a plane is provided on the recording layer 21.

(2-1-2. Method of Recording and Erasing Information in Thermosensitive Recording Medium)

In the thermosensitive recording medium 2 of the present modification example, it is possible to record and erase information in the following manner, for example. It is to be noted that the recording layer 21 is here described by citing as an example a case where the first layer 22, the second layer 23, and the third layer 24 that respectively exhibit the cyan color, the magenta color, and the yellow color are stacked as described above.

Initially, the recording layer 21 (the first layer 22, the second layer 23, and the third layer 24) is heated at temperature, for example, 120° C., to the degree of decoloring the recording layer 21 to preliminarily put the recording layer 21 in a decolored state. Next, using, for example, a semiconductor laser or the like, any portion of the recording layer 21 is irradiated with infrared light whose wavelength and output are selected freely. Here, in a case of coloring the first layer 22, the infrared light of the wavelength $\lambda_1$ is applied with energy to the degree that the first layer 22 reaches coloring temperature. As a result, the photothermal conversion agent 123A included in the first layer 22 generates heat, and color reaction (coloring reaction) arises between the coloring compound 121A and the developing/reducing agent 122A, leading to development of the cyan color in the portion irradiated with the infrared light. Similarly, in a case of coloring the second layer 23, the infrared light of the wavelength $\lambda_2$ is applied with energy to the degree that the second layer 23 reaches coloring temperature. In a case of coloring the third layer 24, the infrared light of the wavelength $\lambda_3$ is applied with energy to the degree that the third layer 24 reaches coloring temperature. As a result, the photothermal conversion agents 123B and 123C that are respectively included in the second layer 23 and the third layer 24 generate heat, and the color reactions arise between the coloring compounds and the developing/reducing agents, leading to respective development of the magenta color and the yellow color in the portions irradiated with the infrared light. In such a manner, irradiation of any portion with the infrared light of the corresponding wavelength allows for recording of information (for example, full-color images).

In contrast, in a case of decoloring each of the first layer 22, the second layer 23, and the third layer 24 that are colored as described above, the infrared light of the wavelength corresponding to each of the layers 22, 23, and 24 is applied with energy to the degree of reaching decoloring temperature. As a result, the photothermal conversion agents 123A, 123B, and 123C that are respectively included in the first layer 22, the second layer 23, and the third layer 24 generate heat, and decoloring reactions arise between the coloring compound 121A and the developing/reducing agent 122A, between the coloring compound 121B and the developing/reducing agent 122B, and between the coloring compound 121C and the developing/reducing agent 122C, which decolors the portions irradiated with the infrared light, leading to erasure of a record. Further, in a case of collectively erasing all the records that are formed in the recording layer 21, the recording layer 21 is heated at temperature, for example, 120° C., to the degree of decoloring all of the first layer 22, the second layer 23, and the third layer 24, leading to collective erasure of information recorded in the recording layer 21 (the first layer 22, the second layer 23, and the third layer 24). Subsequently, performing operation as described above allows for repetitive recording of information in the recording layer 21.

(2-1-3. Workings and Effects)

As described above, in the present modification example, three kinds of the layers (the first layer 22, the second layer 23, and the third layer 24) that respectively include the coloring compounds 121 (121A, 121B, and 121C) exhibiting, for example, the yellow color, the magenta color, and the cyan color, the corresponding developing/reducing agents 122 (122A, 122B, and 122C), and the photothermal conversion agents 123 (123A, 123B, and 123C) having absorption wavelengths different from one another are formed, and such layers are stacked. This makes it possible to provide the thermosensitive recording medium 2 that has the superior durability and allows for multicolor recording.

2-2. Modification Example 2

The above-described modification example 1 gives an example of forming the plurality of layers (the first layer 22, the second layer 23, and the third layer 24) that exhibit colors different from one another as the recording layer 21, and of having a multi-layer structure in which such layers are stacked. However, for example, even a single-layer structure makes it possible to achieve a thermosensitive recording medium that allows for multicolor display.

In FIG. 6, a recording layer 31 is formed by mixing three kinds of microcapsules 31C, 31M, and 31Y respectively including the coloring compounds 121 (121A, 121B, and 121C) that exhibit, for example, colors different from one another (for example, the cyan color (C), the magenta color (M), and the yellow color (Y)) respectively, the developing/reducing agents 122 (122A, 122B, and 122C) corresponding to the respective coloring compounds, and the photothermal conversion agents 123 (123A, 123B, and 123C) that absorb light at wavelength bands different from one another to generate heat. It is possible to form the recording layer 31 in such a manner that, for example, the above-described microcapsules 31C, 31M, and 31Y are dispersed in the polymer material 124 cited, for example, as a constituent material of the above-described recording layer 12, to be applied on the supporting base material 11. It is to be noted that the microcapsules 31C, 31M, and 31Y that encapsulate the above-described materials preferably use, for example, constituent materials of the above-described thermal insulating layers 25 and 26.

As described above, in the present modification example, the coloring compounds 121 (121A, 121B, and 121C) that exhibit, for example, the yellow color, the magenta color, and the cyan color, the corresponding developing/reducing agents 122 (122A, 122B, and 122C), and the photothermal conversion agents 123 (123A, 123B, and 123C) that have absorption wavelengths different from one another are respectively encapsulated in the microcapsules 31C, 31M, and 31Y, which are dispersed in the polymer material 124, thereby forming the recording layer 31. This makes it possible to provide a thermosensitive recording medium 3 having a single-layer structure and allowing for multicolor recording.

It is to be noted that the above-described embodiment and modification example 1 give an example of forming each of the recording layer 12 and the recording layer 21 (the first layer 22, the second layer 23, and the third layer 24) using a single (one kind of) coloring compound; however, a method of forming such recording layers is not limited thereto. In the above-described thermosensitive recording media 1 and 2, each of the recording layer 12 and the recording layer 21 (the first layer 22, the second layer 23, and the third layer 24) may be formed by mixing a plurality of kinds of the coloring compounds 121 that exhibit different colors.

2-3. Modification Example 3

FIG. 7 schematically illustrates a portion of a cross-sectional configuration of a thermosensitive recording medium (a thermosensitive recording medium 4) according to a modification example 3 of the present disclosure. In the thermosensitive recording medium 4 of the present modification example, for example, a recording layer 42 and the protective member 13 having a convexo-concave shape in a plane are provided on a surface of a cylindrical supporting base material 41. The above-described embodiment and modification examples 1 and 2 give examples of providing the recording layer 12 on the flat-surface recording layer 12 (or the recording layers 21 and 31); however, the protective member 13 may be provided on the recording layer 42 having a curved surface, as illustrated in FIG. 7.

3. APPLICATION EXAMPLES

Next, description is provided on application examples of the thermosensitive recording media (the thermosensitive recording media 1 to 4) that are described in the above-described embodiment and modification examples 1 to 3. However, any of configurations of the application examples to be described below is merely an example, and such configurations are modifiable as appropriate. Any of the above-described thermosensitive recording media 1 to 4 is applicable to a portion of a variety of electronic apparatuses and accessories. For example, as a so-called wearable terminal, any of such thermosensitive recording media is applicable to a portion of the accessories, such as, for example, a watch (a wristwatch), a bag, clothing, a hat or a cap, a helmet, a headphone, eyeglasses, and shoes. Besides these accessories, any of such thermosensitive recording media is applicable to the electronic apparatuses including, for example, a wearable display such as a head-up display and a head-mounted display, a portable device such as a portable music player and a portable game console that are carriable, a robot, a refrigerator, and a washing machine, and kinds of the electronic apparatuses are not limited specifically. Further, any of such thermosensitive recording media is not applied only to the electronic apparatuses and the accessories, and is also applicable, for example, as a decorating member to an exterior of a holder or a case for a heat-not-burn cigarette, an electronic cigarette, etc., interior and exterior of an automobile, interior and exterior, such as walls, of a building, an exterior of furniture such as a desk, or the like.

Application Example 1

FIG. 8A illustrates an external appearance of an electronic watch 100 (an electronic apparatus integrated with a wristwatch). The electronic watch includes, for example, a dial face (a character information display section) 110, a protective glass 120, and a band section 130, and the dial face 110 corresponds to, for example, the recording layer 12, while the protective glass 120 corresponds to the protective member 13. On the dial face 110, for example, various characters and patterns are rewritable by the use of a method of recording and erasing information in the recording layer 12 as described previously. The band section 130 is a part wearable around an arm, for example. Providing the recording layer 12 on the band section 130 as well makes it possible to display a variety of colors and patterns, and to change the design of the band section 130.

Application Example 2

FIG. 9A illustrates an external appearance configuration of a front surface of a smartphone 200, and FIG. 9B illustrates an external appearance configuration of a rear surface of the smartphone illustrated in FIG. 9A. The smartphone includes, for example, a display section 210, a non-display section 220, and a casing 230. For example, on one surface of the casing 230 on the rear surface side, for example, the thermosensitive recording medium 1 and the like are provided as an exterior member of the casing 230, which allows a variety of colors and patterns to be displayed. It is to be noted that the smartphone is here cited as an example; however, the application is not limited thereto. For example, the thermosensitive recording medium 1 and the like are also applicable to a notebook-sized personal computer (PC), a tablet PC, or the like.

Application Example 3

FIG. 10A illustrates an external appearance of a top surface of an automobile 300, and FIG. 10B illustrates an external appearance of a side surface of the automobile. The thermosensitive recording medium 1 and the like of the present disclosure are provided on automobile bodies, such as, for example, a bonnet 311, a bumper 312, a roof 313, a trunk cover 314, front doors 315, rear doors 316, and a rear bumper 317, which allows a variety of information and colors and patterns to be displayed on each of the sections. Further, providing the thermosensitive recording medium 1 and the like for an interior of the automobile, such as, for example, a steering wheel and a dashboard allows for display of a variety of colors and patterns.

Application Example 4

FIG. 11 illustrates external appearances of a cigarette holder 410 and a case 420 of a heat-not-burn cigarette 400. The thermosensitive recording medium 1 and the like of the present disclosure are provided on a surface of a casing, such as, for example, the cigarette holder 410 and the case 420 of the heat-not-burn cigarette, which makes it possible to display a variety of information and colors and patterns on each of the sections and to rewrite such information and colors and patterns.

Application Example 5

FIG. 12 is a schematic view illustrating a configuration of a 3D printed material 500. The 3D printed material 500 is a printed matter that varies patterns depending on a viewing angle or gives a three-dimensional appearance. The 3D printed material 500 is configured in such a manner that, for example, a lenticular sheet 510 in which barrel-vaulted convex lenses continue in a line, and a base material 520 on which an image synthesized in a line in accordance with a pitch between the convex lenses is printed are bonded together. The use of the protective member 13 of the thermosensitive recording medium 1 of the present disclosure for the lenticular sheet 510, and the use of the recording layer 12 for the base material 520 make it possible to configure the 3D printed material that allows for display of a variety of information and colors and patterns, as well as rewriting of such information and colors and patterns.

The present disclosure is described thus far with reference to the embodiment and the modification examples 1 to 3; however, the present disclosure is not limited to the modes described in the embodiment and the like in the above, and various modifications may be made. For example, it is not necessary to provide all of the components described in the embodiment and the like in the above, and further, any other components may be included. Further, a material and a thickness of each of the above-described components represent merely an example, and are not limited to those described.

Further, in the above-described embodiment and the like, the reversible recording medium that allows for recording and erasing information in the reversible manner is cited as an example as any of the thermosensitive recording media 1 to 4; however, the present technology is applicable to all of recording media that allow for laser writing in a non-contact manner.

Additionally, in the above-described modification example 2, an example of performing the multicolor display in a single-layer structure using the microcapsules is cited; however, a method is not limited thereto, and it is also possible to perform the multicolor display using a fibrous three-dimensional stereoscopic structure. Fiber to be used here preferably has, for example, a so-called core-in-sheath structure that includes a core section containing a coloring compound exhibiting a desired color, a developing/reducing agent corresponding to such a coloring compound, and a photothermal conversion agent; and a sheath section that dads the core section and includes a thermal insulating material. The three-dimensional stereoscopic structure is formed using a plurality of kinds of fiber that has the core-in-sheath structure and includes the coloring compounds exhibiting colors different from one another, which makes it possible to fabricate a thermosensitive recording medium that allows for the multicolor display.

It is to be noted that the present disclosure may be also configured as follows. According to the present technology of the configurations given below, a protective member having a convexo-concave shape in a plane is provided on a recording layer that includes a coloring compound and the like, resulting in reduction in the area of contact with another member. This allows for enhancement in the durability. It is to be noted that the effects described above are not necessarily limitative, and any of the effects described in the present disclosure may be provided.

(1)

A thermosensitive recording medium including:

a recording layer that includes a coloring compound having electron-donating property, a developer having electron-accepting property, a photothermal conversion agent, and a polymer material; and a protective member that is stacked on the recording layer, and has a convexo-concave shape in a plane.

(2)

The thermosensitive recording medium according to (1), in which a distance from a front surface of the protective member to the recording layer is different in a plane.

(3)

The thermosensitive recording medium according to (1) or (2), in which a difference between a convex portion and a concave portion of the convexo-concave shape is equal to or more than 100 μm and equal to or less than 7 mm.

(4)

The thermosensitive recording medium according to any one of (1) to (3), in which the protective member has a curvature in the plane.

(5)

The thermosensitive recording medium according to any one of (1) to (4), including a hollow structure between the recording layer and the protective member.

(6)

The thermosensitive recording medium according to any one of (1) to (5), in which the recording layer includes a plurality of layers.

(7)

The thermosensitive recording medium according to (6), in which the recording layer includes a first layer and a second layer as the plurality of layers, and the first layer and the second layer include photothermal conversion agents of absorption wavelengths different from each other.

(8)

The thermosensitive recording medium according to (7), in which a thermal insulating layer is provided between the first layer and the second layer.

(9)

The thermosensitive recording medium according to any one of (1) to (8), in which the coloring compound includes a leuco dye.

(10)

The thermosensitive recording medium according to any one of (1) to (9), in which the recording layer includes, as the developer, a developing/reducing agent that allows for coloring and decoloring the coloring compound.

(11)

An exterior member provided with a thermosensitive recording medium on at least one surface of a supporting base material, the thermosensitive recording medium including:

a recording layer that includes a coloring compound having electron-donating property, a developer having electron-accepting property, a photothermal conversion agent, and a polymer material; and a protective member that is stacked on the recording layer, and has a convexo-concave shape in a plane.

This application claims the priority on the basis of Japanese Patent Application No. 2018-163375 filed on Aug. 31, 2018 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A thermosensitive recording medium comprising:

a recording layer that includes a coloring compound having electron-donating property, a developer having electron-accepting property, a photothermal conversion agent, and a polymer material; and a protective member that is stacked on and in contact with the recording layer, wherein the protective member includes a protective member portion and a hollow structure, and wherein the hollow structure of the protective member is in contact with the recording layer and defined by a first end and a second end of the protective member portion in contact with the recording layer.

2. The thermosensitive recording medium according to claim 1, wherein a distance from a front surface of the protective member to the recording layer is different.

3. The thermosensitive recording medium according to claim 1, wherein the recording layer includes a plurality of layers.

4. The thermosensitive recording medium according to claim 3, wherein the recording layer includes a first layer and a second layer as the plurality of layers, and the first layer and the second layer include photothermal conversion agents of absorption wavelengths different from each other.

5. The thermosensitive recording medium according to claim 4, wherein a thermal insulating layer is provided between the first layer and the second layer.

6. The thermosensitive recording medium according to claim 1, wherein the coloring compound comprises a leuco dye.

7. The thermosensitive recording medium according to claim 1, wherein the recording layer includes, as the developer, a developing/reducing agent that allows for coloring and decoloring the coloring compound.

8. The thermosensitive recording medium according to claim 1, wherein a thickness of the protective member ranges from greater than 100 μm to 10 mm.

9. The thermosensitive recording medium according to claim 8, wherein the thickness of the protective member ranges from 200 μm to 10 mm.

10. The thermosensitive recording medium according to claim 1, wherein the protective member portion is a concave shape.

11. The thermosensitive recording medium according to claim 1, wherein the protective member portion includes a linear region having a flat surface that is parallel to the recording layer.

12. The thermosensitive recording medium according to claim 1, wherein the protective member portion includes a plurality of linear regions that are interconnected, wherein each of the linear regions has a flat surface that is not parallel to the recording layer.

13. An exterior member provided with a thermosensitive recording medium on at least one surface of a supporting base material, the thermosensitive recording medium comprising:

a recording layer that includes a coloring compound having electron-donating property, a developer having electron-accepting property, a photothermal conversion agent, and a polymer material; and a protective member that is stacked on and in contact with the recording layer, wherein the protective member includes a protective member portion and a hollow structure, and wherein the hollow structure of the protective member is in contact with the recording layer and defined by a first end and a second end of the protective member portion in contact with the recording layer.

* * * * *